No. 807,993. PATENTED DEC. 19, 1905.
J. Y. BASSELL & F. C. BLENKNER.
GUN SIGHT.
APPLICATION FILED JULY 17, 1905.

2 SHEETS—SHEET 1.

WITNESSES:
Carl Stoughton

INVENTORS
John Y. Bassell
Fred C. Blenkner
BY
ATTORNEYS

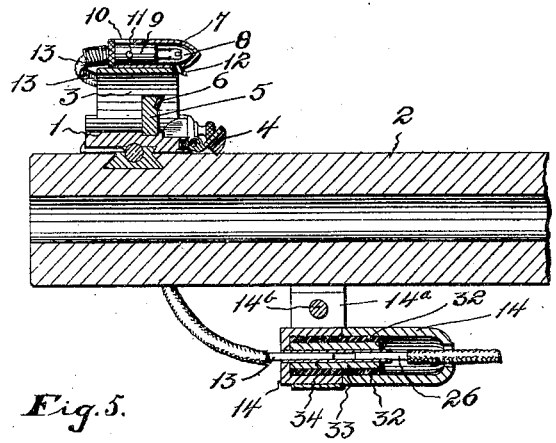
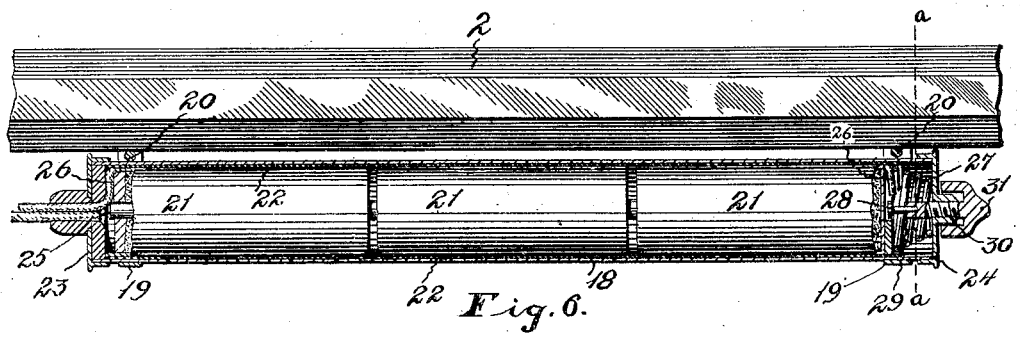
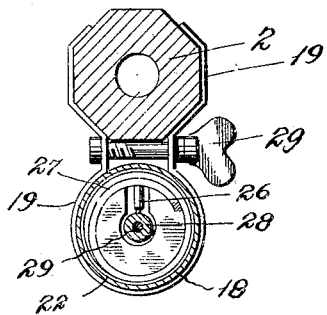
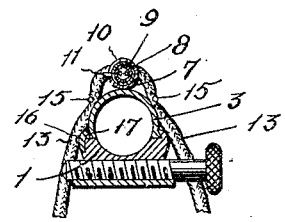
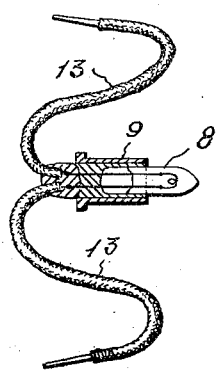

UNITED STATES PATENT OFFICE.

JOHN Y. BASSELL AND FRED C. BLENKNER, OF COLUMBUS, OHIO.

GUN-SIGHT.

No. 807,993.          Specification of Letters Patent.          Patented Dec. 19, 1905.

Application filed July 17, 1905. Serial No. 269,926.

*To all whom it may concern:*

Be it known that we, JOHN Y. BASSELL and FRED C. BLENKNER, citizens of the United States, residing at Columbus, in the county of Franklin and State of Ohio, have invented certain new and useful Improvements in Gun-Sights, of which the following is a specification.

Our invention relates to a new and useful improvement in gun-sights, and more particularly to an electrically-illuminated gun-sight.

The object of the invention is to provide an electrically-illuminated gun-sight of superior construction, which while more especially adapted for application to firearms and rapid-fire guns is equally as well suited to heavy ordnance.

Among the many novel and advantageous features of the invention are the combination of an electric light and a reflector, together with a sight-piece having a sight-center adapted to become luminous when the rays of light emanating from the electric light are intensified and directed thereon by the reflector; also, the concealing and disposition of the electric light, whereby the rays of light are properly projected and reflected without becoming visible from the front of the sight or interfering with the vision of the gunner.

A further novel point of construction resides in the mounting and connection of the electric light or lamp, whereby the latter may be readily attached to or detached from the sight, so as to permit the sight to be used in the day-time as well as at night, as it will be apparent that when sufficient natural light is obtainable artificial light will not be necessary or desirable.

Finally, the object of the invention is to provide a device of the character described that will be strong, durable, and efficient, comparatively inexpensive, and simple to produce, and one in which the several parts will not be liable to get out of working order.

With the above and other objects in view the invention consists of the novel details of construction and operation, a preferable embodiment of which is described in the specification and illustrated in the accompanying drawings, wherein—

Figure 4:
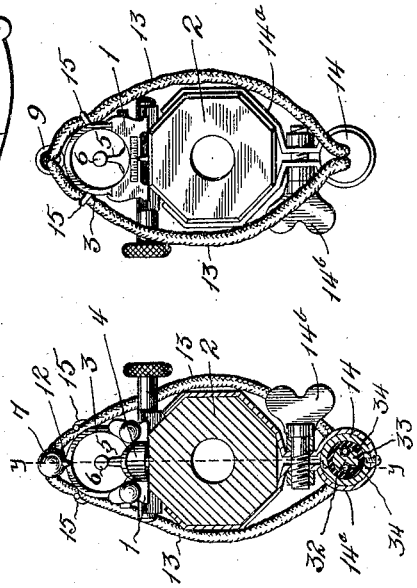
Figure 3:
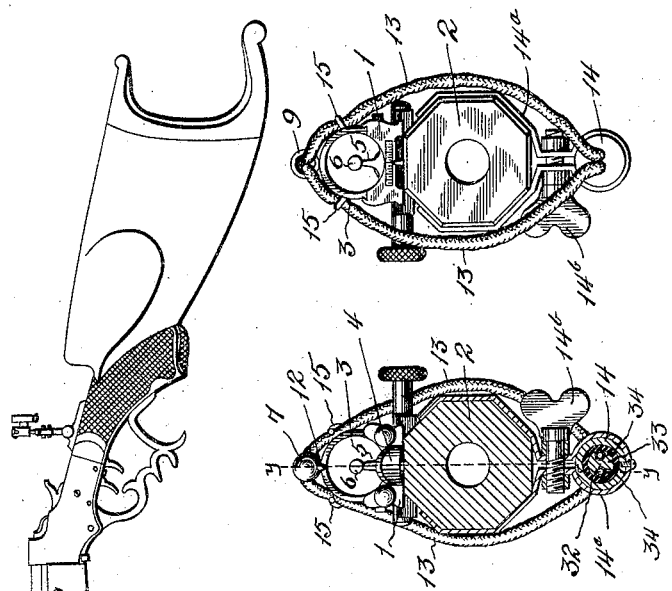
Figure 1:
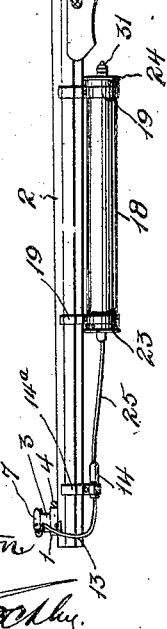
Figure 2:
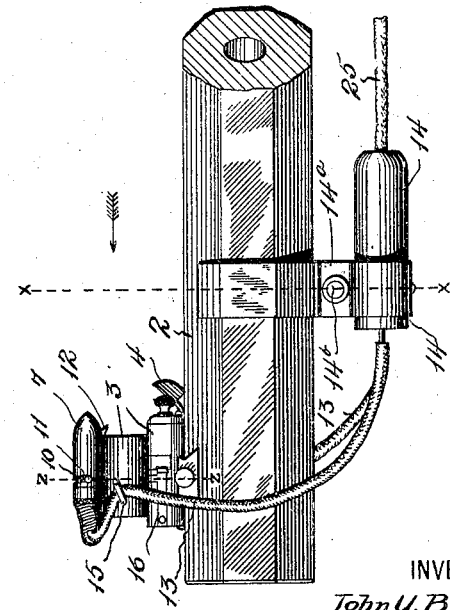

Figure 1 is a side elevation of a rifle, showing our improved gun-sight and parts arranged thereon. Fig. 2 is an enlarged side elevation of the muzzle end of the rifle-barrel and the sight and its connections. Fig. 3 is a transverse vertical sectional view taken on the line $x$ $x$ of Fig. 2 and looking in the direction of the arrow. Fig. 4 is a front elevation of the parts shown in Fig. 2. Fig. 5 is a longitudinal vertical sectional view taken on the line $y$ $y$ of Fig. 3. Fig. 6 is a partial side elevation of the rifle-barrel, showing the battery-carrier in section, the batteries being shown in elevation and two of them being broken away to illustrate their interior construction. Fig. 7 is a transverse vertical sectional view taken on the line $a$ $a$ of Fig. 6. Fig. 8 is a transverse vertical sectional view taken on the line $z$ $z$ of Fig. 2 and looking toward the muzzle of the rifle-barrel; and Fig. 9 is a detail view showing the lamp-socket in cross-section and the lamp and leads in plan.

In explaining and illustrating our invention we have shown the same as applied to a rifle. However, we wish it understood that it may be used on other styles of firearms and ordnance. The gun-sight, exclusive of the electrical attachments, is substantially the same as that illustrated in our application, filed July 11, 1904, bearing Serial No. 215,977, said application having been allowed May 12, 1905.

In the drawings the numeral 1 designates the base of the gun-sight, which is suitably mounted at the muzzle end of the rifle-barrel 2. The gun-sight comprises the removable hood 3, hinged reflector 4, and sight-piece 5, having the sight-center 6 substantially the same as the analogous parts in the said previous application, the sight-center 6 being of some polished or crystal material adapted to become luminous when illuminated by the rays of light directed thereon by the reflector 4. After many experiments and tests we have found that the best results are had by mounting the electric lamp on the hood 3 and causing the rays of light to be projected down on the reflector, so as not to interfere with the vision of the gunner or to be perceptible from the front of the sight. In carrying out this idea we arrange centrally and longitudinally on the hood 3 a casing 7, which projects over and beyond the rear edge of the hood 3. The casing is of such shape as to snugly receive a small electric lamp 8, arranged in a suitable socket 9, the lamp being inserted from the forward end of the casing, which is also provided with an offset slot 10, adapted to receive a pin 11, projecting from the socket 9, so that when the lamp is inserted the pin enters the slot and by giving the lamp a partial turn the pin will be thrown into the offset portion of the slot and the lamp thus locked in place. For directing the rays of light on the reflector a short tube 12 is set at an angle in the rear end of the casing just beyond the hood 3, the said tube being disposed at such an angle as to direct the rays from the lamp 8 directly on the reflector, which latter will intensify the rays and reflect them on the sight-center 6, which will thus be illuminated and become luminous. For conducting the electrical current to the lamp 8 we provide leads 13, connected to the lamp and adapted to have their ends inserted in the forward end of a connection-box 14, hereinafter described. The leads 13 are spread and carried down on each side of the hood 3, suitable hooks 15 being provided on each side of the hood in which the leads are engaged to maintain them in position and prevent them from hanging in front of the globe or hood and thus interfering with the sight. The hood 3, as described in our previous application, is slidable on the base 1, and in the present case to lock the hood in place we provide on the side of the base a spring-latch 16, having a projection 17, (see Fig. 8,) which engages in a notch formed in the hood.

When it is desired to remove the hood 3 and the electrical attachment, it is merely necessary to remove the ends of the leads 13 from the connection-box 14, spring the latch 16 outward, and slide the hood 3 forwardly on the base 1 until it is disengaged therefrom. An ordinary hood, such as shown in our previous application, may now be applied and the rifle used in the usual manner.

For supplying the electrical current to the lamp we provide a battery-carrier 18, which is supported in spring-hangers 19, engaged about the rifle-barrel 2 and securely fastened against movement by thumb-screws, as 20. In the carrier we arrange a number of dry cells 21—say three—of any suitable construction, which dry cells are suitably insulated from the carrier, as by a lining 22, of suitable non-conducting material. At each end the carrier is provided with caps 23 and 24, the feed-wires being passed through the cap 23, and one, 25, being connected with the forward battery, while the other, 26, being suitably insulated is carried rearwardly over the batteries and is passed down through a conical coiled spring 27, which holds the batteries in contact with each other and bears against the cap 24. On its downturned end the wire 26 supports a contact-button 28, which is normally held out of contact with the rearmost battery 21 by the wire, which is of a springy nature, and therefore will not lie flat against the end of the battery. A pin 29 is supported on the button 28 and projects rearwardly into the end of a screw-threaded shank 30, threaded through the cap 24 and provided with an annular head 31, as best illustrated in Fig. 6.

When the head 31 is turned so as to drive the screw 30 inward, the latter by means of the pin 29 forces the contact-button 28 into contact with the battery, and thus closes the circuit. On turning the head the other way the screw will be driven outward and the contact-button pulled away from the battery, the circuit thus being broken. Of course it is to be understood that any suitable form of switch or circuit closing and breaking device may be employed. The feed-wires 25 and 26 are extended forward to the plug-box 14. The plug-box, which is formed in two sections, is supported in a hanger 14$^a$ similar to the hangers 19 and engaged about the rifle-barrel and held in the same manner by a set-screw 14$^b$. Within the box an insulating-sleeve 32 is arranged and acts to connect the two sections of the box. A plug 33 fits tightly within the sleeve 32 and supports two metallic connecting-tubes 34, which have their forward ends projecting through the forward end of the plug-box, which, it is understood, is formed of non-conducting material. The leads 13, hereinbefore described, when inserted in the forward end of the plug-box have their ends engaged in the forward ends of the connecting-tubes 34, while the feed-wires 25 and 26 are passed through the rear end of the box and one inserted in the rear end of each tube, the connection thus being made and all leakage and short-circuiting of the current being avoided. The plug-box and battery-carrier are arranged and positioned on the rifle-barrel so that they will not interfere with the manipulation of the rifle and may be left in position when the electric lamp is not being used—as, for instance, during the day.

In utilizing our device we will suppose that the gunner has been shooting with the day-sight in place. When he desires to use the electrical attachment and illuminate his sight-center by an artificial light, he merely springs out the latch 16, removes the ordinary hood, as shown and described in our previous application hereinbefore mentioned, then, placing the hood 3 upon the base and sliding it thereon until the latch springs into the notch and locks it in place, he only has to insert the ends of the leads 13 in the tubes 34 of the plug-box and he is ready to switch on the current, which is readily accomplished by slightly turning the head 31 so as to cause the contact-button 28 to contact with the rearmost battery, which closes the circuit and lights the lamp 8. The rays of light from the lamp passing through the tube 12 are projected onto the reflector 4, which reflects them onto the sight-center, thus illuminating the same and causing it to become luminous or visible in the most dense darkness. The lamp being wholly concealed and the reflector lying behind the base of the sight and having its reflecting-surface concealed from the gunner, it will be apparent that the rays of light will not interfere with his vision and that neither the rays of light or the reflector will be visible from the front or muzzle end of the gun. Especial attention is directed to the rapidity and ease with which the electrical attachment may be substituted for the ordinary day-sight, and vice versa. It is also to be noted that by employing the luminous sight-center 6 instead of an ordinary sight-center more satisfactory results are had, as the sight-center 6 when illuminated becomes extremely bright and white, thus being more distinct than the ordinary sight, which is just made visible when illuminated. The sight-center 6 upon becoming luminous, while having the effect of a bright and conspicuous spot on a dark surface, in no way interferes with or affects the vision of the gunner.

Having now fully described our invention, what we claim, and desire to secure by Letters Patent, is—

1. In an illuminated sight, a base, a sight-piece mounted on the base, a concealed lamp for illuminating the sight-piece, means for removably supporting the lamp on the base over the sight-piece, and a reflector arranged on the base.

2. In an illuminated sight, the combination with a base and a hood forming with the base a globe, and a sight-piece mounted on the base, of a lamp mounted on the hood for illuminating the sight-piece, and means arranged on the base for intercepting the rays from the lamp and reflecting the same upon the sight-piece.

3. In an illuminated sight, the combination with a base and a hood forming with the base a globe, and a sight-piece mounted on the base, of a lamp carried on the hood, and a reflector arranged on the base to receive the rays of light emanating from the lamp and to direct the said rays on the sight-piece for illuminating the same.

4. An illuminated sight comprising a sight-piece, a lamp supported above the sight-piece so as to project its rays downward, and means independent of the lamp-support and arranged below the same for receiving the rays of light and reflecting them on the sight-piece.

5. In an illuminated sight, the combination with a base and a sight-piece arranged thereon, of a hood removably mounted on the base, and a lamp mounted on the outside of the hood adapted to illuminate the sight-piece.

6. In an illuminated sight, the combination with a base and a sight-piece arranged thereon, of a hood removably mounted on the base, a lamp mounted on the hood adapted to illuminate the sight-piece, and a reflector arranged below the lamp on the base to intercept the rays of light emanating from the lamp and reflect them on the sight-piece.

In testimony whereof we affix our signatures in presence of two witnesses.

JOHN Y. BASSELL.
FRED C. BLENKNER.

Witnesses:
A. L. PHELPS,
M. B. SCHLEY.